Nov. 7, 1967 D. VOEGTLEN ETAL 3,351,721

METHOD AND SWITCHING ARRANGEMENT FOR PREVENTING IMPROPER SETTINGS IN DEVICES OF TELEPHONE EXCHANGE INSTALLATIONS

Filed March 23, 1964 3 Sheets-Sheet 1

LEGEND:

Tz AND Ts = BLOCKING GATES
Mz AND Ms = TESTING CIRCUITS
L+ AND L- = FLIP-FLOP CIRCUITS
U+ AND U- = GATES

LEGEND:
PR, PZ, PS, AND RP = AMBIGUITY TESTERS
Oz, AND Os = OR GATES
WZ, WR, WS, AND RW = MARKER SIGNAL ACTUATORS

United States Patent Office 3,351,721

Patented Nov. 7, 1967

3,351,721

METHOD AND SWITCHING ARRANGEMENT FOR PREVENTING IMPROPER SETTINGS IN DEVICES OF TELEPHONE EXCHANGE INSTALLATIONS

Dieter Voegtlen and Ulrich Korber, Munich, and Hans Joachim Jabczynski, Munich-Solln, Germany, assignors to Siemens Aktiengesellschaft, a corporation of Germany Filed Mar. 23, 1964, Ser. No. 354,173
Claims priority, application Germany, Mar. 26, 1963, S 84,360
10 Claims. (Cl. 179—175.21)

ABSTRACT OF THE DISCLOSURE

A circuit arrangement for preventing false connections in a telephone exchange system, which connections are effected by means of marker signals and which exchange includes a plurality of row conductors and a plurality of column conductors. The circuit arrangement generally includes an energy source which is common to all of the row and column conductors, a marker circuit for connecting one terminal of the energy source to the selected column conductor and the other terminal of the energy source to the selected row conductor, a pair of marker signal sensors one of which is connected to the row conductors and the other of which is connected to the column conductors, and a pair of gate circuits each responsive to a respective one of the signal sensors, one of which is connected between the one terminal of the source and the column conductors and the other of which is connected between the other terminal of the source and the row conductors. The devices which complete the respective connections are not operable to complete the connection within the operation time of the marker signal sensors and the gates so that false connections can be eliminated before such connections are effected.

The invention to be described relates to, among others, certain devices which are used in telephone exchange installations which may be termed indirectly controlled. In such telephone exchange installations the establishment of communication paths does not take place directly through the selector signal transmitted by the selection of the subscriber number. The communication paths are there established only after a conversion of the selector signal and corresponding actuation of various devices which are, among others, the markers, storers, and coordinate switches belonging to the coupling field. In the course of the establishment of the connection, there are applied to the inputs of such devices, markings in the form of the definite voltages or currents, through which the actuation of these devices are effected, as for example, the closing of contacts. Thus, to the row and column lines of coordinate switches belonging to the coupling field, marking potentials are applied which, for example, transmit current to coupling relays lying at the crossing points of the row and column lines, which thereupon respond, resulting in the closing of the appropriate coupling point contacts. Such coordinate switch can, as is well known, also be used as a storer (see German Patent 1,052,469). In order to effect storage operations, marking potentials likewise are applied to the row and column lines. Similarly operated storers also may be fabricated with other switching means, which are arranged in at least two coordinate directions or correspondingly crossed. Such storers, as well as coordinate switches, which serve for selective connection of lines are also usable as exchange installations, for example, in message processing installations, and the invention thus is applicable thereto.

In any case it is important that provision be made to avoid disturbances and false settings of the devices here involved. False settings of storers or coordinate switches belonging to the coupling field may, for example in exchange systems, create wrong connections or even double connections. Wrong results may thereby result in other message processing installations.

It is known practice in devices which are to be set by markers, to make checks to ascertain whether or not the individual devices operate faultlessly (see, for example, German Patent 1,055,616 and German published application 1,113,320). However, not all the possibilities of error to be considered are covered thereby. It is also a known practice (see German published application 1,138,-826), after the setting of coordinate switches belonging to a coupling field, to count the markings lying on the row- and column lines, in order to obtain indications as to whether false markings and, thereby, wrong connections are present. If this proves to be the case, the wrong connections are released. The latter method has the drawback, however, that wrong connections can occur at least from time to time.

The invention discloses a method by which false settings in said devices by reason of false markings can advantageously be completely avoided, and thus involves a method for the avoidance of false settings in devices which are set by marking potentials applied to their inputs, in particular in telephone exchange installations. This method is characterized by the feature that the marking potentials provided by a common energy source to the inputs, and checked, even before such markers have brought about a setting, in regard to their number and/or their distribution over the inputs. It is also possible to check the connections of the marking potentials for the maintenance of previously established conditions, and, with the aid of testing means whose response time is short as compared to the setting time of the device upon the ascertaining of an erroneous marking potential, transmits an error signal which is operative to immediately interrupt the energy supply for the marking potentials before such incorrect settings can be effected.

As already indicated, the method of the invention has the advantage that incorrect settings of the devices involved are completely prevented. Over other methods for the prevention of double connections (see, for example, German published application 1,036,933) there results furthermore the advantages that despite use of a method embodying the invention, intentionally made intrusion corrections are possible, as, in this particular case the interruption of energy supply in the usual manner is omitted, as will subsequently be explained in detail. A method embodying the invention can also advantageously be so employed that it also provides a localization of errors.

In the drawings, wherein like reference numerals indicate like or corresponding parts:

Figure 1:
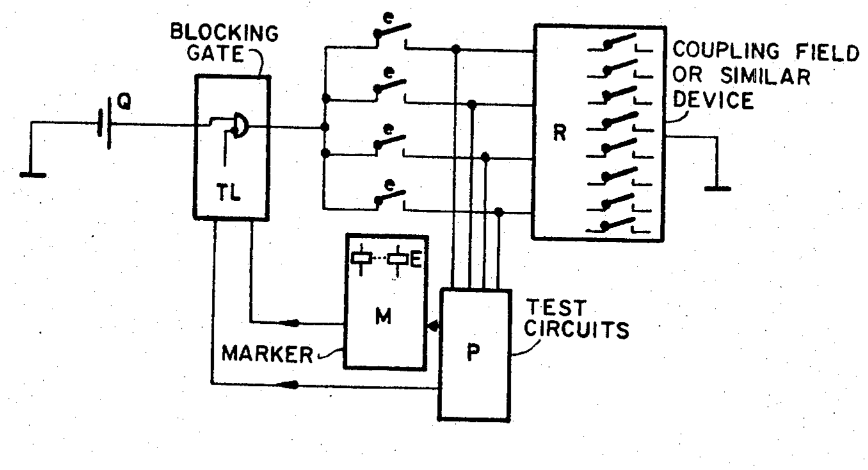
FIG. 1 is a schematic wiring diagram of a system which operates in accordance with the method forming the invention.

Referring to FIG. 1, there is provided a device R which includes contacts that are to be set, the inputs of this device being connected to the contacts *e*, over which marking potentials are applied from the device M, hereafter designated as the marker. These marking potentials are supplied by a common energy source Q, which comprises an electric battery. These marking potentials are applied to the corresponding inputs, through the contacts *e* of the relays E forming a part of marker M. The inputs of the device R are initially connected only to the test circuits P which, in turn, are connected over lines with the marker M and with the device TL, which is inserted in the circuit of the energy source Q and serves the purpose of opening this circuit if necessary. The test circuits P are constructed in such a way that they check the number or/and the distribution of the marking potentials applied to the inputs of device R with respect to the maintenance of previously established conditions. If the applied marking potentials deviate from these conditions, then errors are present. These produce error signals in the test circuit P which are fed to the device TL. Consequently, the energy supply for the marking potentials is immediately interrupted, disconnecting the circuit. The response time of the test circuits P is short as compared to the setting time of the device R, and thus is also short with respect to the response time of the contacts belonging to device R. Consequently, through the immediate interruption of the circuit the possibility of incorrect settings of these contacts is prevented. With the device R of a coordinate switch, for example, in the form of a relay coupler in which upon the marking of the lines of a normal column, a coupling relay is to be caused to respond, by the use of electronic test circuits and an electronic blocking gate in the device TL, the energy supply can, without difficulty, be disconnected before the contacts of the device R can be actuated.

Expediently, error in marking potentials in each case may also be reported to the devices delivering the same. For this purpose the test circuits P are also connected with the marker M possibly transmitting markings, over a line on which error signals can also be delivered. Upon the arrival of error signals the marker M can then cancel the markings just previously applied, as well as the error markings. The interruption of the energy supply already described is in each case prolonged at least until the error markings have been cancelled by the marker M. It therefore is impossible for a wrong setting to occur. In order to insure that the interruption of the energy supply is of sufficient duration through the error signals resulting from incorrect markings, a bistable flip-flop circuit can be actuated, while, by means of the previously described blocking gate located in the device TL, the interruption of the energy supply circuit is maintainable. When the marker M has cancelled the applied marking potentials, a signal is sent to such flip-flop circuit, which is operative to restore the circuit to its rest position. For this purpose the marker M is also connected over a line with the device TL.

As already mentioned, by means of the test circuits P the number and/or the distribution of the marking potentials applied by marker M are controlled. Very often the number of the applied markings is to be so checked that an error signal is created if there occurs a number of markings different from a previously established number.

For example, in the event the device to which the marking potentials are applied, includes a storer into which code signals are to be stored according to a previously established code, as for example, two of *x*, the marking potentials applied to its inputs will result in an error if less or more than precisely two inputs are marked, in either of which cases the test circuits P will deliver error signals. Likewise, if the signals are to be stored in accordance with the code 1 of *x*, the test circuits will be designed to produce error signals when more than one input marking potential is applied. Such test circuits are known under the designation of ambiguity testers (see German Patent 1,044,898). The marker number may, however, also be checked in a manner other than as described, for example, by determining whether it is even or odd.

In the previously mentioned check of the distribution of the applied marking potentials it is often especially important to use for this purpose test circuits over which the error signals are produced if an attempted marking is made on such parts of the device which are still occupied by previously effected settings. Such error markings must also act as the test circuits P over the lines leading thereto. An example of this operation will be subsequently described in connection with a switching arrangement.

The test circuits P can also be so arranged that they also check the individual characteristics of the marking potentials, for example, whether the level of the applied marking voltage is correct. For this purpose test circuits can be used which deliver signals if the voltage fed to them deviates from a certain predetermined level, which circuits, per se, are already known. Through this check of the marking characteristics, for example, disturbances are prevented which occur through the fact that defects exist in the voltage source, creating such a voltage deviation. This arrangement also prevents possible marking trouble resulting from the application of voltages supplied from other devices.

In devices of the type here involved, frequently marking potentials are to be applied to groups of inputs, in which case there are also present groups of marking potentials for which certain predetermined conditions are to be maintained. If the device involves a coordinate switch, the marking potentials applied at the inputs allocated to the row conductors can be suitably checked. Likewise, the marking potentials applied at inputs allocated to the column conductors can be checked as belonging to another group. If a coordinate switch constructed as a relay coupler is employed, a coupling relay is to be actuated, in which case one of the row-conductors and one of the column conductors are to be marked, and a marking therefore must occur in each group of inputs. The checking of the marking potentials can be so effected that each group of inputs is monitored by its own test circuits. In the coordinate switch illustrated as an example, each group is to be monitored by, among other things, an ambiguity tester. The error signals delivered by the test circuits belonging to the groups are then expediently used simultaneously for the error localization. For this purpose they are fed individually to the devices which have applied the corresponding marking potentials where they operate to signal the error in question.

Figure 2:
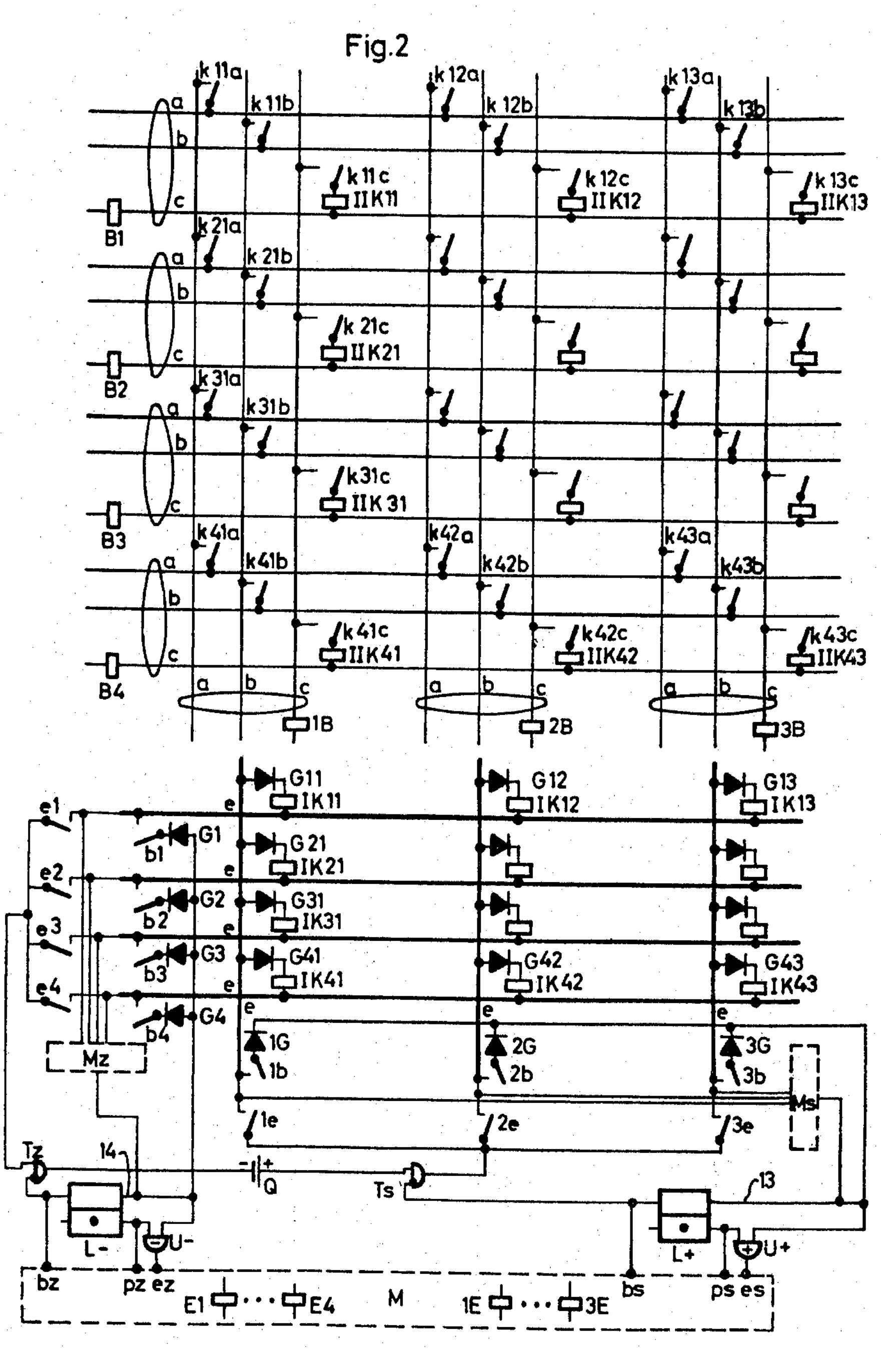
FIG. 2 illustrates an example of a switching arrangement, employing markers which are checked according to the method of the invention.

An example of such a construction, employing a switching arrangement for the practice of the invention, is illustrated in FIG. 2 in which the marking potentials are applied to a coordinate switch, which as previously mentioned is constructed as a relay coupler. The relay coupler consists of coupling relays, each having two windings, which are connected in a cross field formed by multi-lead row-conductors and column conductors. The coupling relays are energized over actuating coils IK11 . . . IK43 and are held over their corresponding holding coils IIK11 . . . IIK43. The actuating coils IK11 . . . IK43 are connected over de-coupling rectifiers G11 . . . G43 to the *e*-leads of the row and column conductors. The holding coils IIK11 . . . IIK43 are connected over the working contacts *k*11*c* . . . *k*43*c*, which belong to the coupling relays, to the *c*-leads of the row and column conductors. The row and column conductors have, in addition, the cell leads *a* and *b*, which can be connected over contacts *k*11*a* . . . *k*43*a* . . . *k*43*b* of the coupling relays, which is the principal purpose of the relay coupler.

In this coordinate switch, test circuits are provided which serve for the checking of both the number of applied marking potentials and their distribution. Here separate test circuits are provided for the inputs allocated to the row conductors and separate test circuits for the inputs allocated to the column conductors. Thus, two groups of inputs or marking potentials subdivided into groups are checked. The marking potentials are applied to the *e*-leads of the row conductors over the row contacts *e*1 . . . *e*4 and to the *e*-leads of the column conductors over the column contacts 1*e* . . . 3*e*. The row contacts *e*1 . . . *e*4 belong to the respective relays E1 . . . E4, and the column contacts 1*e* . . . 3*e* belong to the respective relays 1E . . . 3E, all of which relays are located in the marker M. In the operation of the marker they are selectively energized, so that their associated contacts are actuated. The movable contact of each pair of the line contacts *e*1 . . . *e*4, which is not connected to the inputs, is connected over the common blocking gate Tz, which functions as a switch to the negative pole of the battery Q which serves as an energy source. The corresponding contact of each pair of the column contacts 1*e* . . . 3*e* is connected over the common blocking gate T*s*, which likewise functions as a switch to the positive pole of the battery Q. In the event of an improper marking potential in the row lines the blocking gate Tz will be supplied with an error signal, while the blocking gate T*s* will be supplied with an error signal in the event of an improper marking potential in the column conductors.

For the monitoring of the number of marking potentials there are provided the ambiguity tester M*z* which checks the marking potentials of the row conductors and the ambiguity tester M*s* which checks the marking potentials of the column conductors. Any error signals from an ambiguity tester are first fed to the corresponding flip-flop circuits L+ or L−, and from there are transmitted to the blocking gate T*s* or Tz, where they are operative to effect an interruption of the circuit of battery Q. The flip-flop circuit involved, upon receipt of such an error signal, is thereby flipped into working position, in which condition it remains and retransmits the error signal to the connected blocking gate.

As previously mentioned, in the switching arrangement according to FIG. 2 there are also provided test circuits for the control of the distribution of the marking potentials, which circuits are operated to check whether the marking potentials are applied to row or column conductors to which a coupling relay connected therewith is energized as a result of a previously occurring marking and is still in an energized state. In order to achieve this, there is allocated to each column and line of the coordinate switch a busy relay, such busy relays being designated B1 . . . B4 and 1B . . . 3B, which are connected in series with the *c*-leads of the row and column conductors. When a coupling relay, for example the coupling relay having the coils IK11 and IIK11, is energized, the corresponding contacts *k*11*a*, *k*11*b*, and *k*11*c* are closed. By the closing of contact *k*11*c*, a circuit is established which extends over the busy relay B1, the holding coil IIK11, the contact *k*11*c* and the busy relay 1B. The busy relays B1 and 1B allocated to the corresponding row and column are energized for the duration of the engagement. All the busy relays have busy contacts belonging to test circuits and constructed as working contacts, connected in series with de-coupling rectifiers, over which marking potentials can be retransmitted and error signals thereby established. Such busy contacts are connected to the *e*-leads of the row and column conductors, the busy relays B1 . . . B4 having respective busy contacts *b*1 . . . *b*4 which are in series with the uncoupling rectifiers G1 . . . G4, from which outgoing lines lead to the flip-flop circuit L−. In like manner the busy relays 1B . . . 3B have respective busy contacts 1*b* . . . 3*b* which are in series with the uncoupling rectifiers 1G . . . 3G, from which lines lead to the flip-flop circuit L+. If a marking potential is applied to a row line or a column conductor, to which is connected an energized coupling relay, such marking potential is retransmitted over the closed busy contact belonging to the respective row and column conductors, and the uncoupling rectifier lying in series therewith to the appropriate flip-flop circuit as an error signal, which circuit becomes operative and retransmits the error signal to the connected blocking gate, which thereupon interrupts the circuit and cancels the marking. If the coordinate switch is disposed as a connecting switch in a coupling field, the arrangement prevents the switching of a new connection onto an existing connection, the coupling relay of which is already energized. If, under special conditions, the flip-flop circuit L+ or L−, is immediately restored by a reset signal into rest position, wherein the reset signal has a stronger effect than an error signal, thereby rendering the error signal ineffective, the flip-flop circuit will remain in rest position until the applied marking potentials have acted, and which can subsequently be cancelled, it is also possible to effect an intentional intrusion connection.

The checking of the distribution of the marking potentials described above, in the case of coordinate switches serving as connecting switches, thus is utilizable in connection with intrusion connections. The checking of the markings, on the other hand, is operable to prevent double connections. In other words, for example, if besides a row connection simultaneously therewith, instead of a one, two column conductor were marked, then two coupling relays lying on the same conductor are energized. A connection between the involved row conductor is thereby simultaneously completed with two column conductors. The connection path, previously established up to the connecting line, therefore branches in the coordinate switch under consideration in the coupling field. There exists, therefore, the danger that the two branches will be retransmitted to different subscribers, whereby an undesirable double connection results. This is avoided through the supervision of the number of markings.

As previously mentioned, the error signals are retransmitted over the flip-flop circuits to the blocking gates. The error signals received at the flip-flop circuits cease upon the interruption of the corresponding circuit by the blocking gate, as such signals were dependent upon such circuit. It is accordingly expedient to supply the devices delivering the marking potentials, namely, the marker M−, with the error signals retransmitted by the flip-flop circuit involved instead of with original error signals. The error signals from the flip-flop circuit L−, may for example, pass to the terminal *bz* provided in the marker M and from the flip-flop circuit L+ may pass to the terminal *bs*. From these terminals they can be retransmitted to the devices supplying the markings in question in order therefore to effect the cancellation of the improper markings, which devices include the relays E1 . . . E4 and 1E . . . 3E. The flip-flop circuit over which an error signal is retransmitted, after cancellation of the marking potentials by the devices in question, is restored to rest position with the aid of a reset signal delivered by such devices. These reset signals are supplied over the terminals *pz* and *ps* from marker M.

With such resetting there also can be simultaneously connected means for checking the row contacts and column contacts. For this purpose such reset signals are fed to coincidence gates U+ and U−. If, after resetting of the flip-flop circuit additional error signals are present, this can be due only to the fact that the row and column contacts have not properly moved into their rest position, and the markings therefore have not been correctly cancelled. In this event, after the resetting of the flip-flop circuits over the blocking gate and over these contacts, voltages are again applied to row and column conductors which act as marking potentials. The coincidence gates involved then deliver, as a result of the coincidence of reset signals and error signals, special alarm signals which indicate that the row and column contacts were not properly actuated. These signals arrive at the terminals *ez* and *es* provided in the marker M.

Also the operation of the busy contacts *b*1 . . . *b*4 and 1*b* . . . 3*b* of the busy relays is here ascertainable as a result of marking potentials with correct distribution, first the coupling relay concerned responds, followed by energization of the busy relays belonging to the appropriate row and column and responsive thereto their busy contacts are closed. If the marking potentials are then still applied they pass over these closed busy contacts, as error signals, to the flip-flop circuits involved and from there to the terminals *bz* and *bs* of the marker, whereby it is signalized that the busy contacts were properly closed. This signaling, however, takes place considerably later than an error signal, namely, only after expiration of the response time of the coupling relays and of the busy relays. Signaling of an error takes place after a very brief time, namely, immediately after the row and column contacts concerned were closed. Thereby the two different operational cases are readily distinguished from one another.

It will be noted that to the row conductors the markings are applied in the form of potentials of negative polarity and on the other hand to the column conductors, the markings are applied in the form of potentials of positive polarity. Correspondingly, the original error signals fed to the flip-flop circuit L— and to the coincidence gate U— have negative polarity, while the original error signals fed to the flip-flop circuit L+ and to the coincidence gate U+ have positive polarity. In view of these different operating conditions, reset signals of suitable polarity have to be supplied by the marker. The different voltages, however, are no obstacle to utilizing, in place of two flip-flop circuits and two blocking gates, only one flip-flop circuit and only one blocking gate. In this case, all of the original error signals are fed to the same flip-flop circuit which then retransmits them to the small blocking gate.

Figure 3:
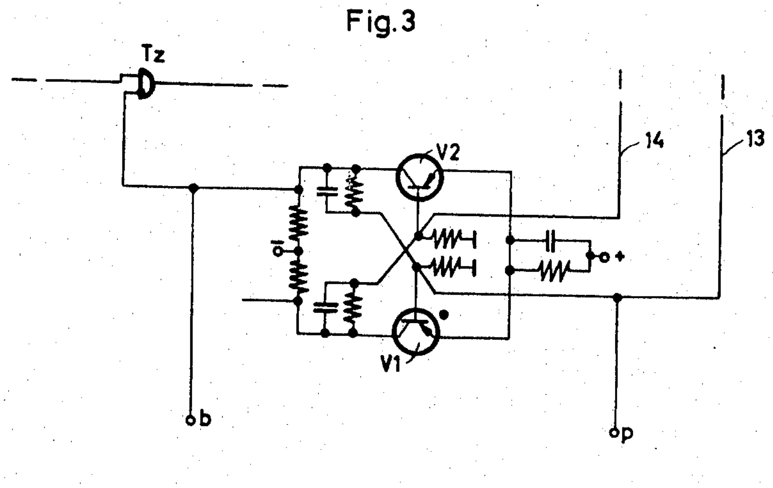
FIG. 3 illustrates a modified form of this switching arrangement.

In FIG. 3 there is illustrated an example of a bistable flip-flop circuit which can be brought by error signals of different polarity from the rest position into the operating position, and is constructed with use of two transistors V1 and V2 in a known manner. In the rest position the transistor V1 is conductive and transistor V2 is blocked. The latter is brought, by an error signal of positive polarity over the line 13, into the working position, since the transistor V1 is thereby blocked, and transistor V2 thereupon becomes conductive. On the other hand, transistor V2 is brought, by an error signal of negative polarity over the line 14, into the working position, since thereby transistor V2 is made conductive, and transistor V1 is thereby blocked. The circuit is restored to rest position by a reset signal of negative polarity over the terminal *p*, since thereby transistor V1 is made conductive, and transistor V2 is thereby blocked. Such a flip-flop circuit, therefore, can be substituted for the two flip-flop circuits L+ and L—, and a single blocking gate thus is adequate for the interruption of the circuit.

Figure 4:
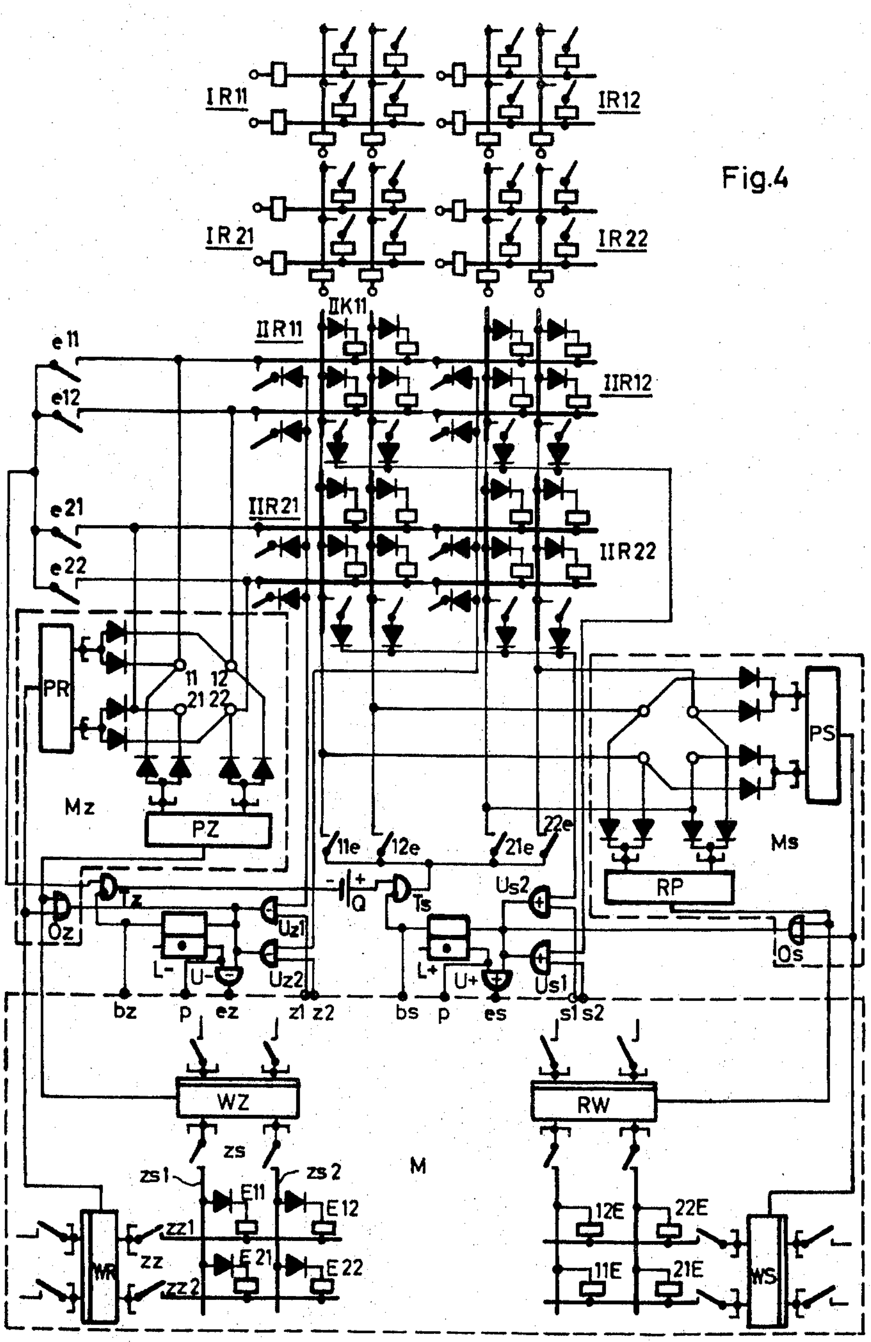
FIG. 4 illustrates a modified form of the switching arrangement of FIG. 2, and illustrating a centralization of the test circuits.

If, with a plurality of devices, the applied marking potentials are to be maintained, and these markings are applied to the various devices only successively, and thus not simultaneously, it is expedient to use at least a part of the test circuits for these devices, which circuits may, for this purpose, be connected with the devices involved. It is also possible, in special cases, to proceed somewhat differently. An example, thereof is illustrated in FIG. 4, in which case the marking potentials are successively applied to four coordinate switches which are to be monitored. The *a*, *b* and *c*-leads of the row and column conductors of the four coordinate lines as well as the associated-contacts and holding coils of the coupling relays and the corresponding busy relays are designated as IR11, IR12, IR21 and IR22. These parts of the four coordinate switches constructed as relay couplers in each case remain independent. The *e*-leads of the row and column conductors having the coupling relay setting coils connected therewith over uncoupling rectifiers are, on the other hand, interconnected with each other in a specific manner. These parts of the four relay couplers are designated as IIR11, IIR12, IIR21 and IIR22.

As illustrated, in FIG. 4, *e*-leads, that is, the setting leads of the row and column conductors of the four coordinate switches are joined into a unitary cross field. This cross field, corresponding to any other single coordinate switch is provided with row contacts *e*11 . . . *e*22 and column contacts 11*e* . . . 2*e*, over which marking potentials can be applied.

The row contacts and the column contacts are connected with each other over the blocking gates T*s* and T*z*, functioning as switches, and the battery Q forming the energy source. The blocking gates T*s* and T*z* receive any error signals over the flip-flop circuits L+ and L—.

Also in the switching arrangement shown in FIG. 4, the busy contacts of the rows and columns of the busy relays allocated to the rows and columns of the coordinate switches for the test circuits are utilized for checking the distribution of the markings. In this arrangement the individual connections of the busy contacts extend not only in the various columns and rows of the same coordinate switch but are extended in the columns and rows of the coordinate switches disposed laterally or vertically adjacent thereto. Thus, for example, busy contacts are allocated in common to the column conductors in the coordinate switches containing actuating coils IIR11 and IIR21 since these two coordinate switches lie one above the other in the cross field. Correspondingly, busy contacts are allocated in common to the column conductors in the coordinate switches with the setting coils IIR12 and IIR22. Likewise, busy contacts are allocated in common row conductors of the laterally adjacent coordinate switches with setting coils IIR11 and IIR12, and in like manner in the coordinate switches with the setting coils IIR21 and IIR22. The common connecting points of the respective groups of busy contacts are extended to the flip-flop circuits L+ and L—, at which there arrive in the checking of the distribution of the marking potentials at a coordinate switch, as error signals, only such markings as were retransmitted over busy contacts belonging to the particular coordinate switch concerned. In order to achieve this result, in the lines leading from the common connecting points of the busy contacts to the flip-flop circuits there are inserted respective coincidence gates U*z*1, U*z*2, U*s*1 and U*s*2, from which, with the aid of signals delivered by the marker, M, only those error signals are conducted which involve the busy contacts belonging to the particular coordinate switch. If, for example, the marking potentials applied to the coordinate switch with the setting coils IIR11 are to be checked any such signals will be conducted only to the coincidence gates U*z*1 and U*s*1 which are respectively connected to the terminals *z*1 and *s*2 of the marker, so that error signals simultaneously arriving at these two coincidence gates are retransmitted to the respective flip-flop circuits L+ and L—. The coincidence gates U*z*1, U*z*2, U*s*1 and U*s*2 can be provided with signals in four different pair combinations, which are respectively allocated to the four coordinate switches, and thus prevent marking potentials applied to a coordinate switch, because of the interconnection of row or column conductors of different coordinate switches, from reaching the flip-flop circuits over closed busy contacts which do not belong to the coordinate switch then being checked, and there acting as false error signals. If, for example, over line contact *e*11 and column contact 11*e* a marking to be checked is applied which energizes the setting coil IIK11 of the setting coils IIR11, this marking cannot act as an error signal, even if the busy contacts belonging to the coordinate switch with the setting coils IIR12 are closed, since the voltage applied over line contact *e*11 can pass only up to the coincidence gate U*z*2, from which it is not retransmitted to the flip-flop circuit L—. The marking applied over the column contact 11*e* cannot, in any case, pass to a busy contact of the coordinate switch with the setting coils IIR12. It extends to a busy contact of the coordinate switch having the setting coils IIR21, but from there it can go only to such coincidence gate U*s*2, from which it is not retransmitted to the flip-flop circuit L+.

In the switching arrangement illustrated in FIG. 4, test circuits are also provided for the control of the number of the applied markings, one circuit M*z* being provided for all the row conductors and another circuit M*s* for all column conductors of the cross field, which test circuits serve in each case as ambiguity testers. Any error signals are delivered from the outputs of the or-gates O*s* and O*z*, respectively associated therewith, and fed to the flip-flop circuits L+ or L—. Special measures which prevent delivery of false error signals are not required, since they are connected to row and column conductors which are not marked at such time, and interfering voltages from other coordinate switches thus cannot be applied.

Expediently, ambiguity testers are used which are constructed in a particular manner, such testers serving as potential for row and column conductors which, according to German Patent 1,039,579 are designed similarly to a coordinate system and are coordinately tested for ambiguity. Such a tester contains, among other things, two ambiguity testers. Thus, the ambiguity tester M*z* contains two ambiguity testers PR and PZ. The four row conductors of the cross field are connected with the terminals 11, 12, 21 and 22, which are here arranged in representation of the row conductors in a two-dimensional coordinate system and are designated after the manner of this coordinate system. To the one input of this ambiguity tester PR, over uncoupling rectifiers, are connected the two terminals 11 and 12 lying adjacent one another in the horizontal coordinate direction, and to the other input of such ambiguity tester are connected, over uncoupling rectifiers, the two other terminals 21 and 22, likewise lying adjacent one another in the horizontal coordinate direction. In a corresponding manner the two inputs of the ambiguity tester PZ, are similarly connected, the two terminals 11 and 21 lying adjacent one another in the vertical coordinate direction being connected over uncoupling rectifiers to one input, and the terminals 12 and 22, being connected over uncoupling rectifiers to the other input. If more than two of the four terminals 11, 12, 21 and 22 are marked, then at least one of the two ambiguity testers PZ and PR delivers an error signal, as is thoroughly described in German Patent 1,039,579. The outputs of the two ambiguity testers are connected to the or-gate O*z*, which retransmits the error signals to the flip-flop circuit L—. The ambiguity tester M*s* provided for checking of the column conductors is designed in a corresponding manner, with use of the two ambiguity testers PS and RP and the or-gate O*s*.

The coordinate system, according to which the terminals are connected with the row and column conductors and serve as potential sources, as described and illustrated, may also have more than two coordinate directions. It is especially advantageous if the type of coordinate system is so selected that such type corresponds with the coordinate type employed in the marking-supply device wherein the switching means includes row and column contacts which serve for the application of marking potentials to the cross field. If a single device to be monitored has numerous inputs, the use of this concept in a corresponding manner is advantageous, whereby the error signals furnished by the ambiguity testers provided for the various coordinate types can be directly fed to the switching means causing the improper markings, to there effect the cancellation of the error.

This feature is also employed in the switching arrangement shown in FIG. 4. The relays which carry the line contacts *e*11 . . . *e*22 form a relay coupler which has coupling relays E11 . . . E22, in which such coupling relays are arranged according to the same coordinate system as the terminals 11 . . . 22 connected with the row contacts. In order that one of these coupling relays will be energized, a potential must be placed on one of the corresponding row conductors *zz*1 and *zz*2 and also placed on one of the corresponding column conductors *zs*1 and *zs*2. This may be accomplished by the devices WR and WZ, which normally are connected over the contacts *zz* and *zs* with the relay coupler under consideration. If, now, in consequence of defective operation, in one of these two devices, for example the WR, a voltage is placed on two row conductors, and two coupling relays are energized, whereby two of the line contacts *e*11 . . . *e*22 are closed with resulting error markings. This has the effect that markings over two of the terminals 11 . . . 22 are retransmitted to both inputs of the ambiguity tester PR, from which an error signal results. Because of the corresponding construction of the two coordinate systems used for the designation and arrangement of terminals 11 . . . 22 and of coupling relays E11 . . . 22, there results an error signal which is directly identified with the device WR causing the error. It can, therefore, be directly fed to this device in order to there signal the error, whereby the error markings can be cancelled at their source. Error markings which are caused by the device WZ are signalled in a corresponding manner by the ambiguity tester PZ, whose output is connected with the device WZ. In corresponding manner, the ambiguity testers PS and RP serving for the monitoring of the number of the marking potentials applied to the column conductors of the cross field are connected with the devices RW and WS, by means of which the coupling relays 11E . . . 22E may be energized.

The novel use of such coordinate systems for the construction of the ambiguity testers MZ and MS which correspond with the coordinate systems utilized in the switching means which control the monitored potential sources thus makes possible an especially efficient monitoring operation. The use of corresponding coordinate systems is also expedient in other devices which are to be monitored and in which resulting error signals may be utilized in suitable manner.

It might be mentioned with respect to the significance of the contacts *zz* and *zs*, over which the devices WR and WZ are to be connected with the relay coupler from the coupling relays E11 . . . E22, that the ambiguity tester MZ can be used, in addition to the monitoring of the new conductors of the cross field shown in FIG. 4, for the monitoring of other devices which are indirectly controlled by the devices WR and WZ, by having them connected therewith over special contacts, depending upon the application. If the devices WR and WZ are, for example, selector devices, then these can be utilized in multiple. This is indicated by multiple-switching representatives which appear in the drawings with the contacts *zz* and *zs*. The fact that the ambiguity tester MZ also may monitor other devices is likewise indicated by multiple switching representatives which are indicated with the coupling rectifiers which are illustrated between the terminals 11 . . . 22 and the inputs of the ambiguity testers PR and PZ. The ambiguity testers PS and PR as well as the devices RW and WS are similarly illustrated.

In the above-described circuit examples for practicing the method of the invention, the marking potentials were applied to coordinate switches of electromechanical construction. The response time—that is, the time interval from the application of the marking potentials until the closing of the contacts concerned—in such case amounts to about a few msec. If test circuits, flip-flop circuits and switches, or blocking gates of electronic construction are used, it is possible to achieve reaction times which are considerably shorter than the response time of the described devices. The maintenance of the time conditions prescribed according to the invention, therefore, presents no difficulty.

Changes may be made within the scope and spirit of the appended claims which define what is believed to be new and desired to have protected by Letters Patent.

We claim:

1. In combination with a system, such as a telephone exchange, which includes a plurality of switching devices each disposed for effecting a connection between a pair of conductors, an apparatus for eliminating false connections therein, comprising (a) an energy source, (b) means for selectively connecting said source to each of the switching devices and to provide marker signals from said source to the switching devices for initiating actuation thereof, (c) means for sensing the occurrence of a predetermined marker signal and of more than one attempted connection by corresponding ones of the switching devices and supplying the predetermined marker signal at an output thereof at a time corresponding to such occurrence, and (d) switching means connected to said sensing means and responsive to the predetermined marker signal for disconnecting said source from said connecting means, the response time of said sensing means and said switching means being shorter than the response time of the switching devices.

2. A combination as defined in claim 1, said sensing means including means for sensing the simultaneous occurrence of more than one marker signal.

3. A combination as defined in claim 1, said sensing means including means for sensing the occurrence of a marker signal and the simultaneous occurrence of a completed connection by a corresponding one of the switching devices.

4. In combination with a system, such as a telephone exchange, which includes a first plurality of conductors, a second plurality of conductors, and switching devices each connected between one of the first plurality of conductors and one of the second plurality of conductors for effecting a connection between one of a third plurality of conductors and one of a fourth plurality of conductors, an apparatus for eliminating false connections therein, comprising (a) an energy source, (b) a first plurality of switches connected between one terminal of said source and the first plurality of conductors, (c) a second plurality of switches connected between the other terminal of said source and the second plurality of conductors, (d) marker means for actuating said first and said second plurality of switches to initiate actuation of at least one of the switching devices by the connection of said source thereto in the form of marker signals, (e) means for sensing the occurrence of more than one marker signal in the first and second plurality of conductors, and (f) means responsive to said sensing means for disconnecting said source from one of said first and said second switches.

5. A combination as defined in claim 4, wherein said disconnecting means includes a flip-flop circuit having an input connected to an output of said sensing means and a blocking gate connected between one of said first and second plurality of switches and said source and having an input connected to an output of said flip-flop circuit.

6. A combination as defined in claim 4, wherein said disconnecting means includes first and second flip-flop circuits and first and second blocking gate circuits, the inputs of said flip-flop circuits being connected to an output of said sensing means, said first blocking gate circuit being connected between said one terminal of said source and said first plurality of switches and having an input connected to an output of said first flip-flop circuit, said second blocking gate being connected between said other terminal of said source and said second plurality of switches and having an input connected to an output of said second flip-flop circuit.

7. A combination as defined in claim 4, wherein said sensing means includes first circuit means for sensing the occurrence of more than one marker signal in the first plurality of conductors and second circuit means for sensing the occurrence of more than one marker signal in the second plurality of conductors, and wherein said disconnecting means includes a first flip-flop circuit connected to an output of said first circuit means, a first blocking gate connected between said one terminal of said source and said first plurality of switches and having a blocking input connected to an output of said first flip-flop circuit, a second flip-flop circuit connected to an output of said second circuit means, and a second blocking gate connected between said other terminal of said source and said second plurality of switches and having a blocking input connected to an output of said second flip-flop circuit.

8. In combination with a system, such as a telephone exchange, which includes a first plurality of conductors, a second plurality of conductors, and switching devices each connected between one of the first plurality of conductors and one of the second plurality of conductors for effecting a connection between one of a third plurality of conductors and one of a fourth plurality of conductors, an apparatus for eliminating false connections therein, comprising (a) an energy source, (b) a first plurality of switches connected between one terminal of said source and the first plurality of conductors, (c) a second plurality of switches connected between the other terminal of said source and the second plurality of conductors, (d) marker means for actuating said first and said second plurality of switches to initiate actuation of at least one of the switching devices by the connection of said source thereto in the form of marker signals, (e) means for sensing the characteristics of the marker signal and for producing an error signal upon the occurrence of a marker signal of inferior qualities, and (f) means responsive to said sensing means for disconnecting said source from one of said first and said second switches.

9. In combination with a system, such as a telephone exchange, which includes a plurality of switching devices each having an actuating member responsive to a marker signal for actuating corresponding switching members connected between one of a first plurality of conductors and one of a second plurality of conductors to effect a connection therebetween, an apparatus for eliminating false connections therein, comprising (a) an energy source, (b) a plurality of switches each connected from said source to a respective one of the switching devices, (c) marker means for selectively actuating said plurality of switches and applying marker signals to respective ones of the switching devices, (d) switching means connected between said source and said plurality of switches, and (e) means for sensing the occurrence of a marker signal and supplying said marker signal to said switching means when a predetermined condition exists indicative of a possible false connection, said sensing means and said switching means having a shorter response time than the response time of the switching devices.

10. A combination as defined in claim 9, wherein said sensing means includes circuit means for sensing the occurrence of an existing connection between one of the first plurality of conductors and one of the second plurality of conductors and the simultaneous occurrence of a marker signal.

References Cited

UNITED STATES PATENTS

| | | | |
|---|---|---|---|
| 3,175,190 | 3/1965 | Gasser | 179—175.21 |
| 3,231,679 | 1/1966 | Lowry | 179—18.211 |
| 3,231,681 | 1/1966 | Warman | 179—175.21 |

KATHLEEN H. CLAFFY, *Primary Examiner.*

H. ZELLER, *Assistant Examiner.*